H. H. ARMSTRONG.
PRESSURE REGULATOR.
APPLICATION FILED JULY 16, 1915.

1,275,641.

Patented Aug. 13, 1918.

Inventor:
HARRY H. ARMSTRONG,
By John H. Bruninga
His Attorney

UNITED STATES PATENT OFFICE.

HARRY H. ARMSTRONG, OF CHICAGO, ILLINOIS, ASSIGNOR TO FIDELITY BRASS MANUFACTURING COMPANY, OF CHICAGO, ILLINOIS, A CORPORATION OF ILLINOIS.

PRESSURE-REGULATOR.

1,275,641.  Specification of Letters Patent.  Patented Aug. 13, 1918.

Application filed July 16, 1915. Serial No. 40,265.

*To all whom it may concern:*

Be it known that I, HARRY H. ARMSTRONG, a citizen of the United States, and residing at Chicago, in the county of Cook and State of Illinois, have invented a certain new and useful Improvement in Pressure-Regulators, of which the following is a specification.

This invention relates to fluid pressure regulators of the type embodying a casing to which the fluid is admitted, and which is equipped with a pressure regulating valve actuated by a flexible diaphragm in turn acted upon and operable by the fluid pressure for closing the valve, there being generally connected with the casing a suitable gage which facilitates setting of the device to a predetermined pressure.

It is customary, in setting such devices, to open the inlet to the casing an amount consonant with a desired pressure to be determined by means of the gage, this pressure being subsequently maintained by the automatic action of the diaphragm controlled valve. In thus setting the regulators, the diaphragms, which are necessarily highly sensitive to pressure variations, have, in prior devices, been subject to more or less prolonged vibration inaugurated under the action of the incoming fluid and transmitted to the gage, thus causing a jumping, unsteady movement of the latter, and, consequently, not only an objectionable waste of time in setting the device for a determined pressure, but also involving difficulty in accurately setting the regulator.

A further defect found in prior devices is liability of the diaphragm, particularly in operating under low pressure, failing to properly close the valve, and possibility of the valve, which is made adjustable in order to facilitate the initial or subsequent adjustment of the parts, accidentally shifting and thereby causing imperfect closing of the valve, resulting in an objectionable pressure within the casing.

This invention has for its objects to provide a comparatively simple and inexpensive device of the character in question, in which objectionable vibration of the diaphragm is effectually prevented, thereby insuring a smooth steady movement of the diaphragm, and, consequently, of the gage, to facilitate accurate setting of the regulator to a determined pressure; one wherein this smooth uniform movement of the diaphragm, even under the influence of sudden changes in the pressure of the fluid, is maintained; one wherein proper closing of the valve, under all pressure operating conditions, is insured; and one in which the regulator valve may be readily adjusted at will, and, thereafter, securely locked against accidental movement.

With these and other objects in view, the invention comprises the novel features of construction and combination of parts more fully hereinafter described.

Figure 1:
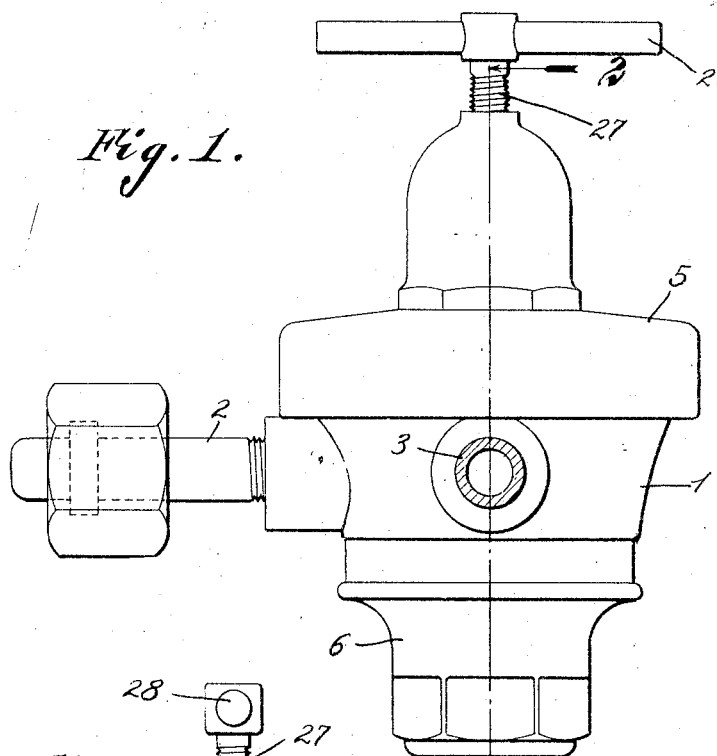
Figure 1 is a side elevation of a pressure regulator embodying the invention.
Figure 4:
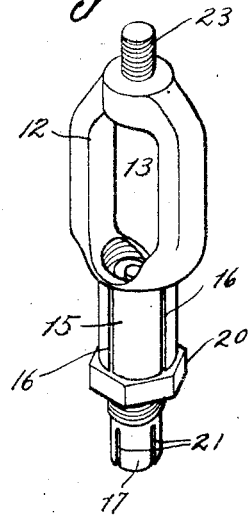
Fig. 4 is a detail perspective view of the valve carrying yoke.
Figure 2:
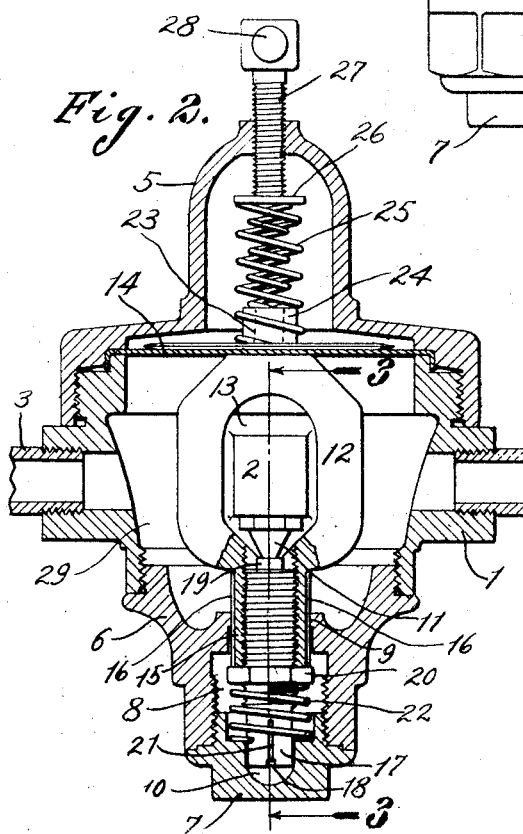
Fig. 2 is a central longitudinal section through the casing, taken on the line 2—2, Fig. 1.
Figure 3:
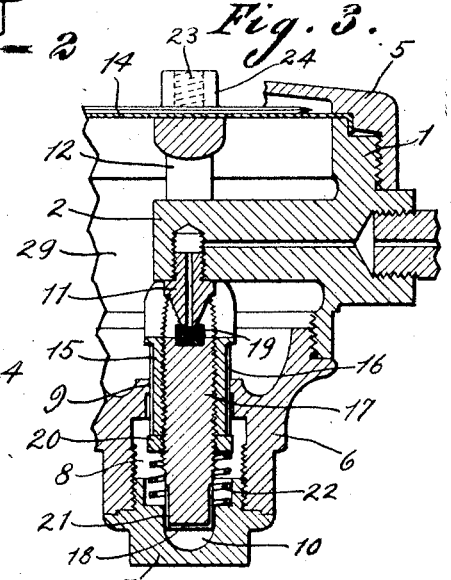
Fig. 3 is a detail section on the line 3—3 of Fig. 2.

Referring to the drawings, 1 designates a casing having an inlet 2, an outlet 3, and an outlet connection 4 leading to a suitable pressure gage, the casing being provided with a removable cap 5, a removable section 6, and a removable closure plug 7 threaded into and for closing the outer end of a main dashpot chamber 8 having a reduced throat 9 and formed by suitably boring the section 6 and the inner end of the plug 7, the latter being further bored to provide a second, or auxiliary, dash-pot chamber 10.

The inlet 2, which is in the form of a pipe or duct, terminates, at its inner end, within the casing, in a right angularly disposed nozzle 11, preferably in the form of a plug, as shown, threaded into a socket formed in the inlet 2, the outer end of the nozzle being of trunco-conical form.

Arranged in the casing is a yoke 12 having a central opening 13 into which the inner end of the inlet pipe 2 projects, this yoke being connected, at one end, with a flexible diaphragm 14 in the form of a disk of sheet metal held marginally in place by soldering to the casing and by the cap 5, the yoke being provided, at its other end, with an internally threaded tubular boss 15 arranged for movement longitudinally of the chamber 8 and snugly fitting the reduced throat 9 of the latter, the boss being provided, on its outer face, with a pair of oppositely disposed fluid passages 16 formed by suitably grooving said boss longitudinally.

Threaded into the boss 15 is an elongated cylindrical member or part 17 provided, at its outer end, with a tool kerf 18, and having its inner end recessed to form a seat for a hard rubber valve disk 19, said member being adjustable for causing the disk to properly bear upon and close the nozzle 11, while tapped onto the part 17, which is threaded throughout only a portion of its length, is a lock nut 20 adapted to bind against the outer end of boss 15, and lock the part 17 against accidental movement. The outer unthreaded portion of the part 17 constitutes a plunger fitting snugly in and for movement longitudinally of the auxiliary dash-pot chamber 10, and is provided with fluid passages 21 formed by grooving the outer face of the plunger longitudinally and at opposite points, it being noted that the part 17 thus subserves the dual function of an adjustable valve plug and a dash-pot plunger.

Loosely surrounding the part 17 within the chamber 8 is a compensating spring 22 having bearing, at one end, against the plug 7, and, at its other end, against the nut 20, and operating to assist the diaphragm in closing the valve, this spring also serving to hold the lock nut against accidental movement.

The diaphragm engaging end of the yoke is provided with a reduced spindle 23 externally threaded to receive a nut 24 which connects the yoke with the diaphragm and also serves as a bearing for one end of a duplex pressure spring 25 having bearing, at its other end, upon a disk or head 26 provided at the inner end of a tension regulating screw 27, threaded through a bearing in the cap 5, and provided, at its outer end, with a suitable finger piece 28, by means of which the screw may be manipulated for varying the tension of the spring 25, as will be readily understood.

In practice the inlet 2 is attached to the gas tank, the outlet 3 to the gas consuming device, and a gage is attached to the connection 4. The tension of the spring 25 on the diaphragm is now practically relieved. The diaphragm is then properly tensioned by adjusting the part 17 to seat the valve 19 accurately upon the outer end of the nozzle 11, so that the diaphragm tension will hold the valve closed against the gas pressure, it being understood that, during this adjustment of the valve plug, the closure plug 7, and also the lock nut 20, are removed. After the diaphragm has been properly tensioned, as explained, the lock nut 20 is screwed into place on the part 17 to bear tightly against the boss 15, and thus lock the valve securely against accidental movement, the spring 22 is then introduced and the closure plug 7 finally screwed into place. If the regulating screw is now adjusted to tension the spring 25, this spring will act in opposition to the diaphragm and spring 22, and overcoming the combined tension of the latter parts, open the valve, thereby admitting the gas, or other fluid, under pressure, to the fluid chamber 29, the extent to which the inlet is opened, and, consequently, the amount of flow of the incoming fluid, being consonant with a predetermined pressure, as regulated by the screw 27, this pressure, when reached, being shown by a pressure gage connected with the outlet connection 4. When the desired pressure is established, an increase will cause the fluid, acting on the diaphragm 14 and assisted by spring 22, to move the diaphragm and the yoke 12 against the action of spring 25, thereby seating the valve against the mouth of the nozzle 9, and cutting off the flow of fluid. When the pressure within the chamber 29 drops below the determined point, the spring acts on the diaphragm 14 to open the valve 19 and permit a further inflow of fluid, as will be readily understood.

A portion of the incoming fluid flows from chamber 29 through passages 16 and 21 respectively into the main and auxiliary dash-pot chambers 8 and 10 forming a cushion against which the plunger, formed by the boss 15 and part 17 acts to take up and prevent objectionable vibration of the diaphragm 14, there being thus provided a compound or double dash-pot, which will retard the diaphragm, and, through the medium of the yoke 12, at all times render the movements of the diaphragm smooth and uniform. Thus provision is made for obviating a jerky irregular motion of the pressure gage at such times as the inlet 2 may be opened to admit fluid to the chamber 29, and consequently, providing for a rapid and accurate setting of the device to a predetermined pressure, which will, of course, be automatically maintained through the action of the diaphragm controlled valve 19.

It has been found in practice that the flexible diaphragms tend to soon loose their tension and thus become defective for properly closing the valve, especially when the regulators are operating under comparatively low fluid pressure, resulting in an objectionable leakage of noxious gases. By providing the compensating spring 22, which compensates for such loss of tension on the part of the diaphragm, and which supplements the action of the latter in closing the valve, the objection in question is overcome and a proper closing of the valve, even under low pressure, is insured.

It is obvious that various changes may be made in the details of construction without departing from the spirit of this invention. It is, therefore, to be understood that this invention is not to be limited to the specific construction shown and described, except as set forth in the appended claims.

Having thus described the invention, what is claimed is:

1. A pressure regulator comprising a casing, a valve in said casing, a diaphragm for controlling said valve, said casing being recessed to form chambers, and a plunger attached to said diaphragm and coöperating with said chambers to form a compound dash-pot.

2. A pressure regulator comprising a casing having a port, a diaphragm controlled valve for said port, said valve being adjustable, a lock-nut for locking the valve in adjusted position, and a spring supplementing the action of the diaphragm and arranged to hold the lock-nut.

In testimony whereof I affix my signature.

HARRY H. ARMSTRONG.